Patented Jan. 6, 1953

2,624,717

UNITED STATES PATENT OFFICE 2,624,717

PRODUCTION OF OILS HAVING DRYING PROPERTIES

Edward M. Geiser, Downers Grove, Ill., assignor to Universal Oil Products Company, Chicago, Ill., a corporation of Delaware No Drawing. Application August 27, 1949, Serial No. 112,829

9 Claims. (Cl. 260—23.5)

1

This invention relates to a process for the production of oleaginous materials possessing resinous and/or elastomeric properties and capable of drying upon exposure to atmospheric oxygen to form a tough resinous film, the particular properties of the product depending upon the specific type of reactants and reaction conditions selected in the preparation thereof.

More specifically, the invention concerns the production of oleaginous or resinous products by the copolymerization of a fatty acid ester drying oil and a particular type of hydrocarbon drying oil in a successive series of reactions involving catalytic and thermal copolymerization of said unsaturated reactants to produce thereby a drying oil of the oxidative drying type capable of forming dried film superior in many respects to either of the individual drying oil starting materials.

It is commonly known that certain types of hydrocarbons having a cyclic, unsaturated structure and of relatively high molecular weight are capable of drying upon exposure of the same in a thin film to atmospheric oxygen to form a resinous, protective coating. One of the preferred sources of such hydrocarbon drying oils is the hydrocarbon material recovered from the decomposition of certain sludges formed in the conjunct polymerization of unsaturated hydrocarbons in the presence of a particular type of catalyst capable of effecting said conjunct polymerization, as hereinafter described.

It is further known that when such hydrocarbons are utilized as drying oils individually, the dried films obtained on exposure of said hydrocarbon drying oils to atmospheric oxygen have a tendency to be brittle, tend to yellow or darken upon aging and have poor weather and abrasion resistance, the film tending to check and peel as well as discolor upon exposure of the films to sunlight and alternate high and low temperatures. It has now been discovered that when said polyolefinic, cyclic hydrocarbon drying oils are copolymerized with unsaturated fatty acid ester drying oils in a two-stage process involving either an initial thermal polymerization of said drying oils followed by a catalyzed polymerization reaction or a catalytic copolymerization followed by a thermal copolymerization of the catalytically copolymerized product, a superior drying oil, resinous, and/or elastomeric material is obtained which is substantially free of the film-forming deficiencies noted in the case of the oxidative drying of the polyolefinic, cyclic hydrocarbon drying oil individually. Investi-

2 gation of the process has indicated that the superior drying oil properties of the copolymer product are obtained only by the successive thermal and catalytic copolymerization reactions and that the product obtained by either the thermal or catalytic copolymerization individually does not exhibit the same degree of desired film-forming characteristics. The present process, therefore, provides a method of upgrading the drying properties of the polyolefinic, cyclic hydrocarbons while retaining certain desirable attributes thereof, such as resistance of the dried films obtained therefrom to aqueous and alkali media.

In one of its embodiments, this invention relates to a copolymerization process for effecting the cobodying of a mixture of an unsaturated fatty acid ester and unsaturated conjunct polymers consisting of polyolefinic, cyclic hydrocarbons wherein said mixture is copolymerized in stages by thermal and catalytic means, the improvement of said process which comprises effecting said copolymerization in an initial stage by one of said means and thereafter subjecting the product of said initial stage to the other of said copolymerization means.

In one of its more specific embodiments, the present invention concerns a process for the preparation of an improved drying oil which comprises cobodying a mixture of an unsaturated fatty acid ester and an unsaturated conjunct polymer thermally at a temperature of from about 150° C. to about 450° C., preferably from about 200° to about 400° C., adding to said thermally cobodied product, a copolymerization catalyst consisting of a boron trifluoride etherate and thereafter subjecting the resulting mixture of catalyst and thermally cobodied hydrocarbon and unsaturated fatty acid ester drying oils to a temperature of from about 0° C. to about 300° C. to effect catalytic copolymerization thereof and improvement in the drying properties of the copolymer.

Other objects and other embodiments of the present invention will be further described in greater detail in the following further description of the invention.

One of the primary starting materials charged to the present process and herein specified as an unsaturated fatty acid ester, which in general, is subject to atmospheric oxidative drying, occurs naturally as fatty acid glycerides recovered from various animal, vegetable and marine life sources. These may be charged to the cobodying or copolymerization process as the glyceride esters or alternatively, the glycerides may be hydrolyzed to liberate the unsaturated fatty acids themselves which may be utilized in the present process. In accordance with still another modification of the product, the latter fatty acids may be re-esterified with other types of alcohols, such as ethanol, the polyhydroxy glycols, such as ethylene glycol, pentaerythritol, sorbitol, and the like, or by the alkanol amines, represented for example, by the mono- and polyethanol amines to form the corresponding esters having modified drying oil properties. Since copolymerization of reactant monomers requires the presence of active copolymerizable centers in the reactant molecule and usually occurs between unsaturated carbon atoms in the chain of the reactant molecules, the fatty acid monomers utilizable as charging stocks herein must contain at least one unsaturated bond per fatty acid chain in the ester or acid molecule in order to undergo the desired copolymerization reaction comprising the present process. Included among the unsaturated fatty acid ester drying oils utilizable herein are the drying and semi-drying classes containing conjugated and/or non-conjugated olefinic double bonds in the molecular structure of the oil. Of these, tung oil, linseed oil (either raw or boiled linseed oil), dehydrated castor oil, oiticica oil, perilla oil, olive oil, cottonseed oil, coconut oil, soybean oil, hempseed oil, poppyseed oil, safflower oil, walnut oil, etc., are representative oils of the glyceride ester type containing olefinic unsaturation. Certain members of the above series containing conjugated unsaturation, such as tung oil, linseed oil, oiticica oil, and dehydrated castor oil are especially preferred herein when the object of the process is the production of a high molecular weight elastomeric copolymerization product or when the desired ultimate product is an oil having the ability to dry rapidly upon exposure to atmospheric oxygen. The numerous unsaturated bonds in conjugated relationship to each other contained in the latter oils accounts for the ability of said oils to undergo more rapid and more extensive copolymerization with the unsaturated conjunct polymers to yield high molecular weight, highly unsaturated copolymers.

The reactant monomers copolymerized in accordance with the present invention with the unsaturated fatty acid ester monomer and herein designated as unsaturated conjunct polymer hydrocarbons, or polyolefinic, cyclic hydrocarbons, are generally of relatively high molecular weight above about 250 and are of cyclic, non-aromatic structure containing conjugated as well as non-conjugated olefinic unsaturation. Hydrocarbons of the above type which independently have drying oil properties and dry upon exposure to atmospheric oxygen to form hard protective coatings are preferably derived from certain catalyst-hydrocarbon sludges recovered from hydrocarbon conversion processes utilizing catalysts capable of causing conjunct polymerization between the hydrocarbon reactants charged thereto. Typical of the catalysts capable of causing said conjunct polymerization are the various Friedel-Crafts metal halides, such as anhydrous aluminum chloride and aluminum bromide and certain members of the mineral acids, such as concentrated sulfuric acid, substantially anhydrous hydrogen fluoride, boron trifluoride, as well as others generally known to the art. The above catalysts, when contacted with a hydrocarbon reactant, generally a non-aromatic hydrocarbon mixture, such as mono- or polyolefins containing at least 3 carbon atoms per molecule or a branched chain paraffin, at temperatures of from about $-10°$ C. to about $200°$ C., preferably at temperatures of from about $30°$ to about $100°$ C., and at pressures sufficient to maintain the reactants in substantially liquid phase, cause conjunct polymerization among the hydrocarbon reactants, forming as one product of the reaction, a sludge-like material containing catalyst-hydrocarbon addition complexes as a distinct reaction product of the process. Conjunct polymerization occurs in the mixture of catalyst and hydrocarbons by virtue of simultaneous polymerization, cyclization and hydrogen transfer reactions between the hydrocarbons charged, forming thereby relatively saturated hydrocarbons as one product of the reaction and the above sludge-like product comprising the catalyst and said unsaturated conjunct polymers in combination as addition complexes thereof. The desired unsaturated conjunct polymers are recovered from the sludge by special methods of decomposing the catalyst-hydrocarbon complexes in a manner such that the highly unsaturated structure of the conjunct polymers is retained. The chemical bonds existing between the catalyst and the unsaturated conjunct polymers are generally relatively weak and may be broken without deleterious effect upon the recovered conjunct polymers by such methods as heating the sludge in the presence of a sludge decomposition catalyst or in the presence of an inert hydrocarbon diluent, by hydrolyzing the sludge, as for example, by adding the sludge to water or to a dilute caustic solution, or they may be recovered by extraction or displacement with a solvent or a more reactive material. The unsaturated conjunct polymers thus recovered have molecular weights of from about 250 to about 450, although the components of the high boiling fractions may have molecular weights of as high as 1000. The polymers boil over a temperature range of from about $175°$ to about $450°$ C., contain from about 2 to about 4 double bonds per molecule in conjugated as well as non-conjugated relationship to each other, of which about 70% are conjugated, and are of water-white to pale yellow in color, the lack of color being an important characteristic in the formulation of coating compositions. A more detailed description of the preparation and the method of recovering the conjunct polymers as well as their physical and chemical properties may be had by reference to the art.

In accordance with the process of this invention copolymerization of the unsaturated conjunct polymers and unsaturated fatty acid ester drying oil reactants is effected by a two-stage reaction wherein the reacting monomers are subjected in admixture to a thermal polymerization in an initial stage followed thereafter by a catalytic copolymerization, or alternatively, by a combination of an initial catalytic copolymerization followed thereafter by a thermal copolymerization of the resultant catalytic copolymer. The order of the thermal and catalytic treatments is apparently immaterial in the attainment of an ultimate copolymer product having desirable drying oil properties, although certain operational advantages accompany the method whereby thermal copolymerization is effected in an initial stage followed by the catalytic copolymerization of the thermal copolymer. This effect is believed to be explained on the basis that each type of polymerization process affects certain double bonds present within the molecular structure of the reactant molecules and that when both types of polymerization are effected successively, the maximum copolymerization is obtained involving all or a major proportion of the double bonds present in the reactants. The net effect of the successive operation is the production of a drying oil product capable of producing superior dried films than the corresponding films obtained from a copolymerization reaction of the reactant monomers utilizing either catalytic or thermal copolymerization individually. The highly unsaturated structure of the hydrocarbon component of the reaction mixture is introduced, via the copolymerization, into the structure of the glyceride oil, the net effect of the copolymerization being to increase the molecular weight of the drying oils and to increase the total unsaturation, both effects resulting in an improvement of the drying properties of the oils.

Thermal copolymerization is effected by heating the mixture of drying oils or the previously formed catalytic copolymer product in the absence of any recognized catalytic agent to a temperature of from about 150° to about 450° C., preferably from about 200° to about 400° C., for a period of time determined by the viscosity desired of the ultimate product which increases as the reaction period is extended. For purposes of the present invention, the period of heating is generally continued until the viscosity of the cobodied mixture of drying oils attains a value of from about 20 to about 80 poises, the required period of time generally being from about 2 to about 6 hours, shorter period of polymerization being required when utilizing a glyceride drying oil containing conjugated unsaturation than one containing only isolated unsaturation. Thermal cobodying of a mixture of unsaturated conjunct polymers and an unsaturated fatty acid glyceride drying oil is effected with a relatively large saving in time by heating the mixture of oils in an evacuated atmosphere, as for example, at subatmospheric pressures in the region of from about 10 to about 50 mm. of mercury absolute. The drying oils, either individually or the mixture thereof before subjecting the same to the copolymerization reaction, may receive a blowing treatment by passing steam or air through the drying oil or mixture thereof at a temperature below the combustion point of the oils to provide a drying oil containing a high degree of unsaturation and particularly of conjugated unsaturation. The ratio of the respective hydrocarbon and unsaturated fatty acid ester drying oils in the copolymerization reaction mixture may be varied over considerable limits but generally, the desired ratios are determined on the basis of the number of unsaturated bonds contained in the molecular structure in the respective drying oils. Hydrocarbon drying oils of the type recovered from conjunct polymerization catalyst sludges and herein referred to as unsaturated conjunct polymers generally contain from about 2.5 to about 4 double bonds per molecule, while the unsaturated fatty acid ester drying oils generally contain from about 1 to about 3 double bonds per molecule. The ratio of drying oils charged to the copolymerization reaction, therefore, preferably varies from about 1 to about 3 molecular proportions such that, in general, the total number of unsaturated bonds derived from the unsaturated conjunct polymer hydrocarbon drying oil is maintained approximately equivalent to the number of bonds derived from the unsaturated fatty acid glyceride drying oil.

The catalytic copolymerization stage of the present process wherein the mixture of unsaturated conjunct polymer hydrocarbons and unsaturated fatty acid ester drying oil is copolymerized in the presence of a suitable catalytic agent which promotes the copolymerization of the charging stock components, may be effected either in the initial stage on the original drying oils charged to the process or, alternatively, by adding the catalyst to the initially thermally copolymerized drying oil mixture and thereafter subjecting the resulting catalyst-drying oil mixture to catalytic copolymerization reaction conditions. In general, the preferred procedure comprises copolymerizing the mixture of drying oils catalytically in the initial stage, subsequently separating the used catalyst from the mixture of copolymerized drying oils and thereafter subjecting the product of the initial copolymerization to the thermal treatment. This procedure generally produces a superior product with respect to various physical properties, such as color, and a more desirable product with respect to drying properties. Typical catalysts utilizable in the catalytic stage comprise, in general, substances characterized as acid-acting compounds, including certain mineral acids, (preferably phosphoric acid), certain Friedel-Crafts type metal halides such as aluminum chloride, ferric chloride, boron trifluoride, zinc chloride, etc., or their addition complexes with certain organic oxygen-containing complex-forming compounds such as ethers, alcohols, ketones, etc.; and acid-acting solid catalysts, such as the acidic composites of certain hydrous oxides (for example, silica-alumina), or the composite referred to in the art as a "solid phosphoric acid catalyst" produced by calcining a suitable phosphoric acid (such as pyrophosphoric acid) with a siliceous adsorbent such as kieselguhr. The preferred members of this group include the Friedel-Crafts halide complex addition compounds such as boron trifluoride etherate, boron trifluoride diethanolate, aluminum chloride methanolate, and the acidic hydrous metallic oxide composites, such as a calcined silica-alumina composite. Catalytic copolymerization is effected at temperatures of from about 0° to about 300° C., preferably from about 0° to about 200° C., at which temperatures the development of color in the copolymerized mixture of drying oils is substantially eliminated. Copolymerization in the presence of the catalyst is complete within a relatively shorter period of time than copolymerization by thermal means, copolymerization periods of from about one-half to two hours duration generally being sufficient.

The catalyzed reaction may be effected by suspending the catalyst in the mixture of oils (where the catalyst is substantially insoluble in said oils) and maintaining the catalyst particles relatively uniformly distributed throughout the mass by rapid stirring or other agitation or by passing the mixture of oils through an elongated reactor containing the catalyst supported upon a fixed carrier such as particles of alumina, silica or other adsorbent material. Heating of the reaction mixture may be effected by any suitable means, preferably by a method designed to prevent the development of local high temperature zones in the mixture of oils and high skin temperatures near the source of heat. For this purpose, the mixture of catalyst and drying oils may be vigorously stirred and a suitable heating surface such as steam coils may be embedded in the body of the mixture of oils and catalyst to distribute the applied heat uniformly.

Following the catalytic copolymerization stage of the process and at least prior to the thermal copolymerization (where the catalytic reaction precedes the thermal reaction) the catalyst is desirably removed by means of a filtering or extracting procedure, depending upon the type of catalyst utilized in the catalytic copolymerization reaction. For example, where a solid, insoluble catalyst is utilized in the reaction, such as a silica-alumina composite or a solid phosphoric acid catalyst, the copolymerized product may be removed from the reaction mixture by simple filtration or decantation, while in the case of utilizing a catalyst which is soluble in the reaction mixture, such as a boron trifluoride etherate catalyst, the latter is desirably recovered therefrom by a suitable extraction procedure with water or other solvent for the catalyst.

The product of the present process has widespread utility in various arts, depending upon the physical properties of the material. Deep-seated or high temperature polymerization of the drying oil reactants in some cases produces soft, pliable resinous products which may be incorporated into drying oils and as such are also subject to polymerization and oxidation reactions which take place during the so-called "drying" of the composition. The products may also be oleaginous liquids having valuable film-forming properties upon drying during exposure to atmospheric oxygen and for such purposes are superior to either of the individual drying oil reactants charged to the process. The present products dry to hard, tough films which resist abrasion and due to their large hydrocarbon content, are also resistant to aqueous and alkali media. Paint and varnish formulations containing the present copolymerized drying oils dry rapidly and yield tough resinous films.

The following examples are presented for the purpose of illustrating the present process in some of its specific applications, but should not be construed as restricting the generally broad scope of the invention, either as to the reacting components or to the specific reaction conditions utilized in the examples.

*Example I*

A synthetic hydrocarbon drying oil containing a mixture of unsaturated conjunct hydrocarbon polymers comprising polyolefinic cyclic hydrocarbons was prepared by the following reaction.

22 liters (16.5 kg.) of non-selective copolymers (polymers of mixed butylenes and propylene referred to as a polymer gasoline) having a bromine number of 162 and consisting predominantly of mono-olefinic hydrocarbons containing from about 8 to about 12 carbon atoms per molecule was charged into an autoclave and rapidly stirred as 9.0 kg. of liquid anhydrous hydrogen fluoride was introduced into the reactor. The pressure was maintained throughout the reaction at an average value of about 205 pounds per square inch by means of compressed nitrogen. The temperature was increased to 91° C. and stirring was continued for an additional hour. The reaction mixture separated into two phases on standing: an upper saturated hydrocarbon layer (bromine number=10) and a lower acidic sludge layer.

The lower sludge layer weighed 16.1 kg. after removal of entrained "upper layer" by extracting the latter with liquid pentane and was a light brown, mobile fluid having a density of 0.98 at 4° C. Its yield, based on the total olefinic charge, was 63 percent.

100 g. of the above hydrogen fluoride sludge was allowed to flow into a mixture of ice and water, additional ice being added as the heat of the resulting hydrolysis reaction melted the ice. 43.4 g. of a light-colored, sweet-smelling oil separated from the aqueous phase; a yield of 42.2% based on the weight of the original olefins charged and 43.4% based on the weight of sludge hydrolyzed. An examination of the oil indicated the following properties:

| | |
|---|---|
| Boiling range | 160° to above 400° C. |
| Density $n_D^{20}$ | 0.863 |
| Refractive index, $n_D^{20}$ | 1.4871 |
| Color, Gardner | 12–13 |
| Molecular weight, average | 263 |
| Diene number | 85 |
| Bromine number | 195 |
| Specific dispersion | 143 |
| Percent fluorine | 0.06 |
| Double bonds/molecule (average) | 3.2 |

Although the hydrocarbon drying oil as prepared above was obtained from a hydrogen fluoride sludge and was recovered therefrom by an aqueous hydrolysis procedure, a somewhat similar material may be obtained from an aluminum chloride or sulfuric acid sludge, and the conjunct hydrocarbon polymers comprising said drying oil may be also recovered from the hydrogen fluoride sludge by distilling off the hydrogen fluoride in the presence of a sludge decomposition catalyst or by contacting the sludge with a hot naphtha maintained at a temperature above about 100° C.

The mixture of unsaturated conjunct polymers prepared as indicated above was vacuum distilled to separate a fraction boiling normally at 325° to 400° C. 88 grams of this fraction and 96 grams of an alkali refined linseed oil were mixed with one percent of its combined weight of a boron trifluoride etherate complex catalyst at 5° C. and maintained at the latter temperature for five hours to effect the catalytic copolymerization of the drying oils charged to the reaction. The temperature was then allowed to rise to approximately room temperature (about 30° C.), and the resulting mixture then shaken with twice its volume of water to dissolve the boron trifluoride etherate catalyst therefrom. The decanted, insoluble organic layer was then heated to a temperature of about 400° C. and maintained at this temperature for a period of approximately 12 hours, the low boiling fractions of the product being allowed to distill over to be collected. The residue consisting of about 75% by weight of the total weight of drying oil charged was a very viscous fluid having a reddish color and a molecular weight of from about 1000 to about 2000. This product, when spread as a thin film upon a stainless steel panel and exposed to atmospheric oxygen dried to a tack-free, non-brittle protective coating within two days, the coating having a Sward hardness of 10–15. The test panel when subjected to a Mandrel flexure test indicated that the dried film thereon did not check, crack or peel even upon extreme flexure of the test panel.

To determine the quality of drying oil obtained by thermal polymerization alone of a mixture of unsaturated conjunct polymers and linseed oil, a mixture of said reactants similar to that employed in the above run was subjected to thermal copolymerization in the following experiment.

*Example II*

88 grams of the 325° to 400° C. fraction of a mixture of unsaturated conjunct polymers prepared as in Example I above was mixed with 96 grams of alkali refined linseed oil and the latter mixture heated to a temperature of about 400° C. in a stirred closed autoclave in which the pressure was increased to about 2 atmospheres by nitrogen pressured into the autoclave. The mixture was maintained at 400° C. with continuous stirring for a period of approximately 5 hours and then allowed to distill at atmospheric pressure to separate the low boiling components which failed to copolymerize during the heating operation. The residue at a pot temperature of 425° C. was then allowed to cool under a nitrogen atmosphere. The residue, representing the copolymer of linseed oil and the unsaturated conjunct polymers charged to the copolymerization reaction, weighed approximately 164 grams, indicating at least partial copolymerization of the linseed oil and unsaturated conjunct polymer charging stocks. The product, a viscous, reddish colored oleaginous material, when spread as a thin film upon a stainless steel panel and exposed to atmospheric oxygen did not completely dry, but remained as a tacky, soft, spongy coating even after 32 days of exposure to atmospheric oxygen.

*Example III*

In the following run, the effect of catalytic copolymerization individually, in the absence of succeeding or preceding thermal copolymerization, on the drying properties of the ultimate product obtained was determined. The results are to be compared to the product obtained in Example I above.

Approximately 44 grams of the 325° to 400° C. fraction of a mixture of unsaturated conjunct polymers prepared as in Example I above was mixed with 48 grams of alkali refined linseed oil and the mixture adjusted to a temperature of about 6° C. for one and one-half hours in the presence of a freshly prepared sample of boron trifluoride diethyl etherate catalyst in an amount representing 5% by weight of the reaction mixture. The mixture was thereafter distilled at a pressure of approximately 0.01 mm. mercury to remove unreacted hydrocarbons, the temperature of the still pot approaching 200° C. (the approximate end-point of the hydrocarbon component at normal pressure). The residue represented a 65% yield of the original reactants charged. It was of reddish brown color and somewhat less viscous than the thermal copolymer. When spread as a thin film on a drying test panel and exposed to atmospheric oxygen, it failed to dry to a tack-free surface even after 35 days of exposure at a constant temperature of about 25° C.

I claim as my invention:

1. A process for the copolymerization of an unsaturated fatty acid glyceride ester and a mixture of conjunct polymers consisting essentially of polyolefinic, cyclic hydrocarbons having molecular weights of from about 250 to about 450 and containing from about 2 to about 4 double bonds per molecule, of which about 70% are conjugated, said process comprising thermally cobodying said ester and polymer mixture at a temperature of from about 150° to about 450° C., adding a copolymerization catalyst to the thermally cobodied product, and subjecting the latter to catalytic copolymerization at a temperature of from about 0° to about 300° C.

2. The process of claim 1 further characterized in that said thermal cobodying is effected at a temperature of from about 200° to about 400° C.

3. The process of claim 1 further characterized in that said catalytic copolymerization is effected at a temperature of from about 0° to about 200° C.

4. The process of claim 1 further characterized in that said copolymerization catalyst consists of a boron trifluoride addition complex of an organic oxygen-containing compound.

5. The process of claim 1 further characterized in that said copolymerization catalyst consists of a boron trifluoride etherate.

6. The process of claim 1 further characterized in that said polymerization catalyst consists of a boron trifluoride diethyl etherate.

7. A process for the copolymerization of an unsaturated fatty acid glyceride ester and a mixture of conjunct polymers consisting essentially of polyolefinic, cyclic hydrocarbons having molecular weights of from about 250 to about 450 and containing from about 2 to about 4 double bonds per molecule, of which about 70% are conjugated, said process comprising reacting said ester and said mixture in successive stages, one of said stages being a catalytic copolymerization and another being a thermal copolymerization in the absence of polymerizing catalyst.

8. The process of claim 7 further characterized in that the thermal copolymerization precedes the catalytic copolymerization.

9. The process of claim 7 further characterized in that the thermal copolymerization follows the catalytic copolymerization.

EDWARD M. GEISER.

REFERENCES CITED

The following references are of record in the file of this patent:

UNITED STATES PATENTS

| Number | Name | Date |
| --- | --- | --- |
| 2,039,364 | Thomas et al. | May 5, 1936 |
| 2,397,600 | Gerhart | Apr. 2, 1946 |
| 2,398,889 | Gerhart | Apr. 23, 1946 |
| 2,523,609 | Bloch et al. | Sept. 26, 1950 |